(12) United States Patent
Nam

(10) Patent No.: US 11,039,110 B2
(45) Date of Patent: Jun. 15, 2021

(54) METHOD AND APPARATUS FOR MANAGING OBJECT IN WIRELESS COMMUNICATION SYSTEM

(71) Applicant: Samsung Electronics Co., Ltd., Suwon-si (KR)

(72) Inventor: Hyeongmin Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/481,040

(22) PCT Filed: Jan. 5, 2018

(86) PCT No.: PCT/KR2018/000302
§ 371 (c)(1),
(2) Date: Jul. 25, 2019

(87) PCT Pub. No.: WO2018/143571
PCT Pub. Date: Aug. 9, 2018

(65) Prior Publication Data
US 2019/0394428 A1     Dec. 26, 2019

(30) Foreign Application Priority Data
Jan. 31, 2017    (KR) ........................ 10-2017-0013717

(51) Int. Cl.
*H04N 7/18*     (2006.01)
*H04W 4/029*     (2018.01)
*H04W 76/10*     (2018.01)

(52) U.S. Cl.
CPC ............ *H04N 7/183* (2013.01); *H04W 4/029* (2018.02); *H04W 76/10* (2018.02)

(58) Field of Classification Search
CPC ....... H04N 7/183; H04W 4/029; H04W 76/10
See application file for complete search history.

(56) References Cited

U.S. PATENT DOCUMENTS

2008/0079561 A1*   4/2008   Trundle ............... G08B 25/002
                                                                340/506
2008/0111883 A1     5/2008   Maolin et al.
(Continued)

FOREIGN PATENT DOCUMENTS

EP             2557784 B1     3/2016
KR    10-2003-0012371 A     2/2003
(Continued)

OTHER PUBLICATIONS

ISA/KR, "International Search Report and Written Opinion of the International Searching Authority," International Application No. PCT/KR2018/000302, dated Apr. 6, 2018, 13 pages.

*Primary Examiner* — Francis Geroleo

(57) ABSTRACT

This disclosure relates to communication technique that fuses a 5G communication system with IoT technology to support higher data transfer rates than a 4G system and, a system thereof. This disclosure can be applied to intelligent services based on 5G communication technology and IoT related technology (for example, smart home, smart building, smart city, smart car or connected car, healthcare, digital education, retail, security and safety related services, or the like). The present invention discloses a feature related to a method of a server for managing objects in a wireless communication system. More specifically, the object management method of a server according to an embodiment of the present invention comprises: a step of determining whether a preset event for an object to be managed located in a reference zone is occurred; a step of obtaining image information corresponding to the reference zone, in case that the preset event is occurred; and a step of providing the obtained image information with a notification corresponding to the preset event.

11 Claims, 15 Drawing Sheets

(56) References Cited

U.S. PATENT DOCUMENTS

| | | |
|---|---|---|
| 2013/0039634 A1 | 2/2013 | Sundar |
| 2013/0321150 A1* | 12/2013 | Koenig ................. G08B 25/08 340/541 |
| 2014/0132763 A1* | 5/2014 | Billau ................ H04N 21/4627 348/143 |
| 2014/0184406 A1 | 7/2014 | Trundle et al. |
| 2014/0232861 A1* | 8/2014 | Naidoo ............ G08B 13/19695 348/143 |
| 2016/0054429 A1 | 2/2016 | Jalali et al. |
| 2016/0105762 A1 | 4/2016 | Singh et al. |

FOREIGN PATENT DOCUMENTS

| | | |
|---|---|---|
| KR | 10-0837406 B1 | 6/2008 |
| KR | 10-1182986 B1 | 9/2012 |
| KR | 10-2016-0139231 A | 12/2016 |

\* cited by examiner (Prior Art)

METHOD AND APPARATUS FOR MANAGING OBJECT IN WIRELESS COMMUNICATION SYSTEM

CROSS-REFERENCE TO RELATED APPLICATIONS

This application is a 371 National Stage of International Application No. PCT/KR2018/000302, filed Jan. 5, 2018, which claims priority to Korean Patent Application No. 10-2017-0013717, filed on Jan. 31, 2017, the disclosures of which are herein incorporated by reference in their entirety.

BACKGROUND

1. Field

The disclosure relates to a wireless communication system and, more particularly, to a method and apparatus for managing objects in a wireless communication system.

2. Description of Related Art

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system". To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs to big data processing described above may be an instance of convergence of 5G communication technology and IoT technology.

Large organizations such as research institutes, hospitals, universities, companies, and factories have many equipments or devices related to the corresponding fields. Examples may include medical instruments in hospitals, computing, research and office equipments in corporates, and laboratory equipments in universities. Managing and monitoring these diverse equipments is a very costly process, and it is difficult to keep track of the locations of the equipments being moved according to specific situations.

To this end, asset management systems have been used in which a radio frequency identification (RFID) tag or a barcode is attached to each device and the manager manages and monitors the devices through a reader or the like. However, as devices are constantly moved to different places, some of them cannot be found immediately when needed or may be lost, making it difficult to track assets. Recently, various technologies have been introduced to track assets by attaching wireless sensors, such as Bluetooth low energy (BLE) tags or Wi-Fi tags, to the devices.

For example, with reference to FIGS. 1A and 1B, in an asset management system, a BLE tag is attached to an asset to be managed, the BLE tag and the asset are mapped, and the mapping result is stored in the asset management server. The BLE tag signal is received by scanning through a BLE-specific receiver or a device equipped with a Bluetooth radio (e.g., smartphone, or PDA). The received BLE scan signal may include a unique device ID of the BLE tag and a signal strength indication. The BLE receiver or the device equipped with a Bluetooth radio adds location information to the scanned unique ID and transmits it to the asset management server. The asset management server may compare the information received from the BLE receiver or the Bluetooth radio equipped device with the table of mappings between BLE tags and assets stored in the database to thereby determine the location and state of the asset corresponding to the received information.

When the asset is managed in a designated space, the location and the state of the asset can be managed using a BLE tag shown in FIGS. 1A and 1B. Here, the management system for the designated space may be as shown in FIG. 2. That is, the management system for the designated space may include a plurality of individual systems. For example, as shown in FIG. 2, a CCTV camera, an access control reader, a light, a sensor, an IP device, and the like are connected to their corresponding networks and managed individually in each management system.

SUMMARY

As described above, the management system for a designated space is composed of individual systems managing different types of devices. Hence, when an asset located in the designated space is stolen or lost, it is necessary to examine the individual systems for each type of device located in the designated space to understand the situation of theft or loss of the asset.

According to an embodiment of the disclosure, there is provided a method of managing objects for a server. The method may include: determining whether a preset event for an object to be managed located in a reference zone is occurred; obtaining image information corresponding to the reference zone, in case that the preset event is occurred; and providing the obtained image information with a notification corresponding to the preset event.

According to an embodiment of the disclosure, there is provided a wireless access device supporting object management. The wireless access device may include: a wireless communication unit configured to receive image data from a shooting device; a data buffer configured to receive the image data from the wireless communication unit and store the image data for a preset time; and an interface configured to receive a request message from a management server, wherein the data buffer is configured to transmit, to the interface, image data of an interval corresponding to a time point at which the request message is received, among the received image data, if the request message is received within the preset time.

According to an embodiment of the disclosure, the object management method can efficiently track an object by performing various operations according to a situation where an event occurs in relation to the object.

DETAILED DESCRIPTION

Figure 1A:
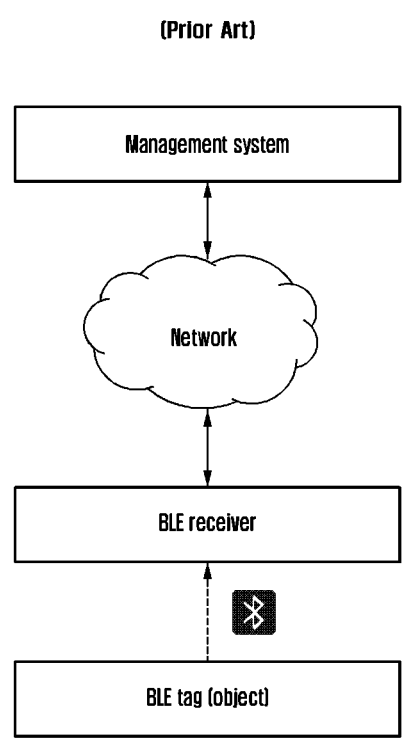
FIGS. 1A and 1B are conceptual diagrams illustrating a related art technology for managing the states of assets.
Figure 1B:
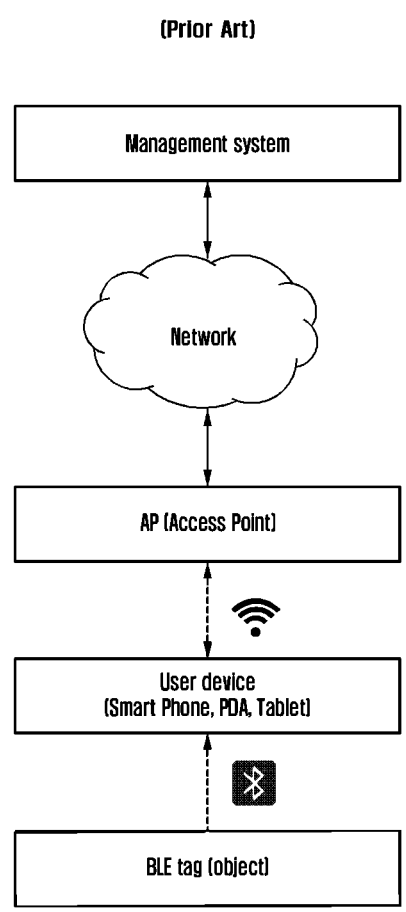
Figure 2:
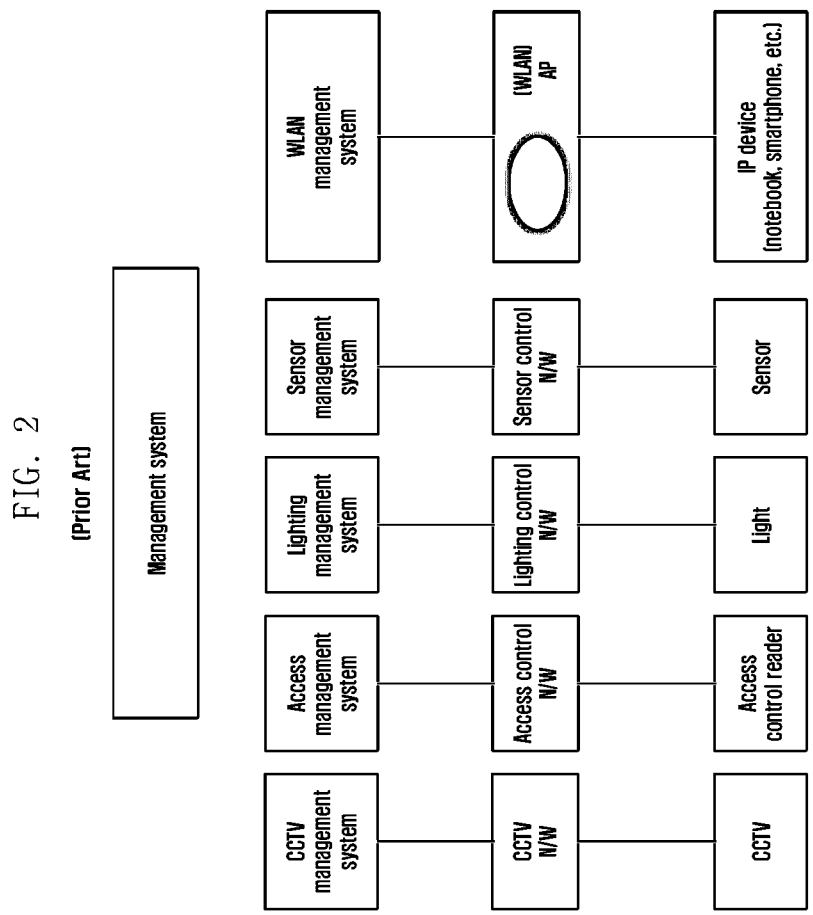
FIG. 2 is a conceptual diagram of a management system including a plurality of individual systems.

Descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

It should be understood by those skilled in the art that the subject matter of the disclosure is applicable to other communication systems having similar technical backgrounds and channel configurations without significant modifications departing from the scope of the disclosure.

The aspects, features, and advantages of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

Hereinafter, embodiments of the disclosure are described in detail with reference to the accompanying drawings.

Figure 3:
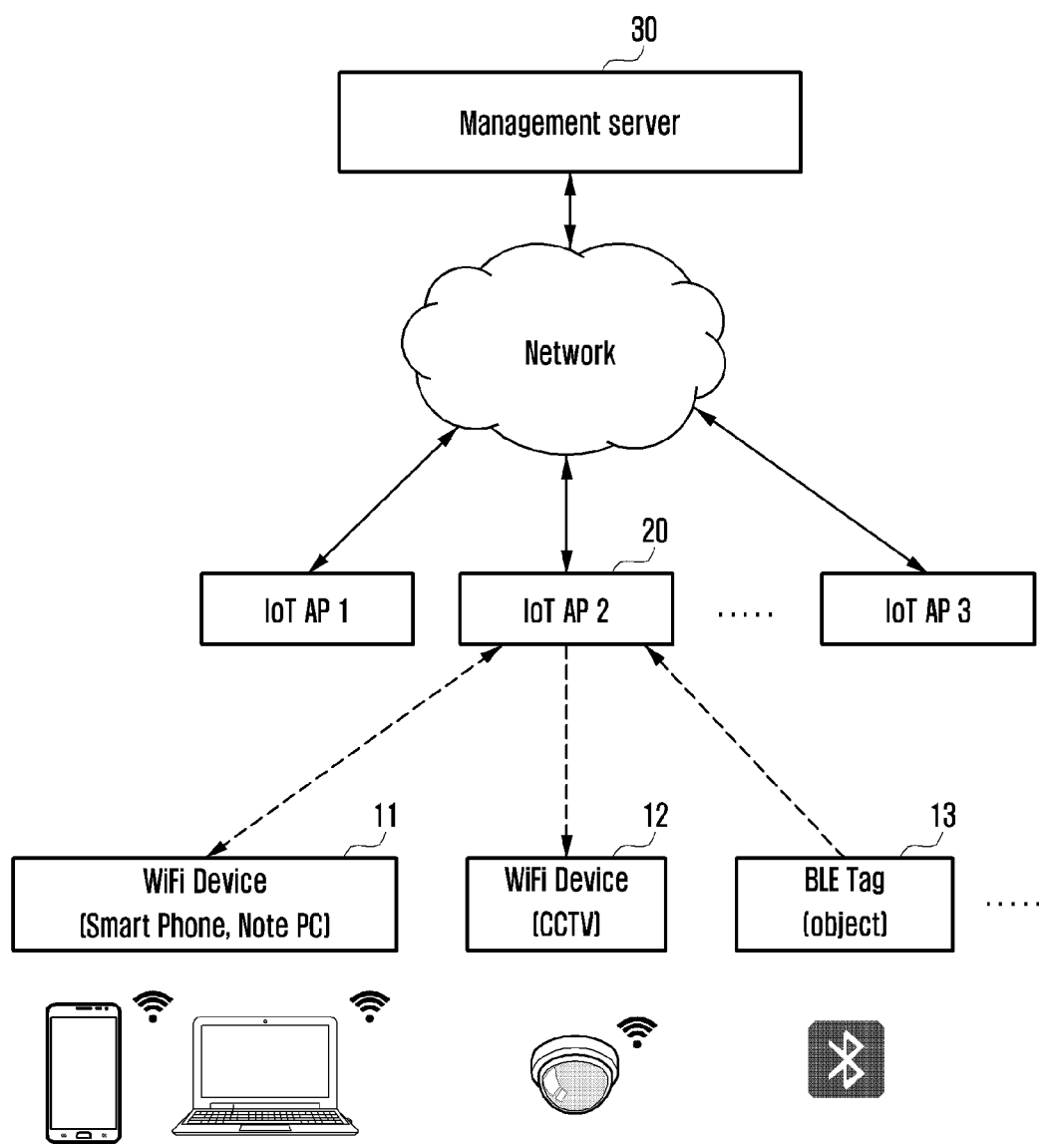
FIG. 3 is a conceptual diagram illustrating an object management system according to an embodiment of the disclosure.

FIG. 3 is a conceptual diagram illustrating an object management system according to an embodiment of the disclosure.

With reference to FIG. 3, the object management system according to an embodiment of the disclosure may include a management server 30, at least one access point (AP) 20, and a plurality of devices wirelessly connected to the at least one AP.

In one embodiment, the plurality of devices may include any electronic device that can be wirelessly connected to the AP 20. For example, the plurality of devices may include a user terminal 11, a wireless device 12 based on Wi-Fi, and a wireless device 13 based on BLE.

In one embodiment, the AP 20 can support wireless connection with multiple devices. For example, the AP 20 can support the Wi-Fi radio access function of the Wi-Fi based wireless devices 11 and 12 and the BLE radio scan function of the BLE based wireless device 13. The AP 20 may receive various data from the plural devices or may transmit control signals to the plural devices.

The AP 20 can transmit data received from the plural devices to the management server. For example, the at least one AP 20 may be wiredly connected to the management server, and may transmit requested data to the management server 30 among the received data.

In one embodiment, the management server 30 may communicate with the AP 20. The management server 30 may receive data through communication with the AP 20, and can use or process the received data to manage the object to be managed. For example, the management server 30 may receive the BLE tag information of the object to be managed 13 from the AP 20, and manage the state and location of the object to be managed based on the received information.

As described above, in the object management system according to an embodiment of the disclosure, data received from a plurality of devices via a wireless connection can be transmitted to the management server. The management server can process the data items received from plural devices in association with each other. That is, the object management system can collect data for managing objects to be managed from a plurality of devices, and effectively use the collected data to track the objects to be managed.

For example, when an object to be managed located in a specific space is lost, to track the object to be managed, information on the loss situation in the space, user information related to the loss, or information on the progress after the loss is needed. In one embodiment, multiple information items necessary for tracking the object to be managed are separately collected from multiple devices, transmitted to the management server, and processed in combination by the management server processes, thereby reducing the time and cost for identifying the loss situation.

Figure 4:
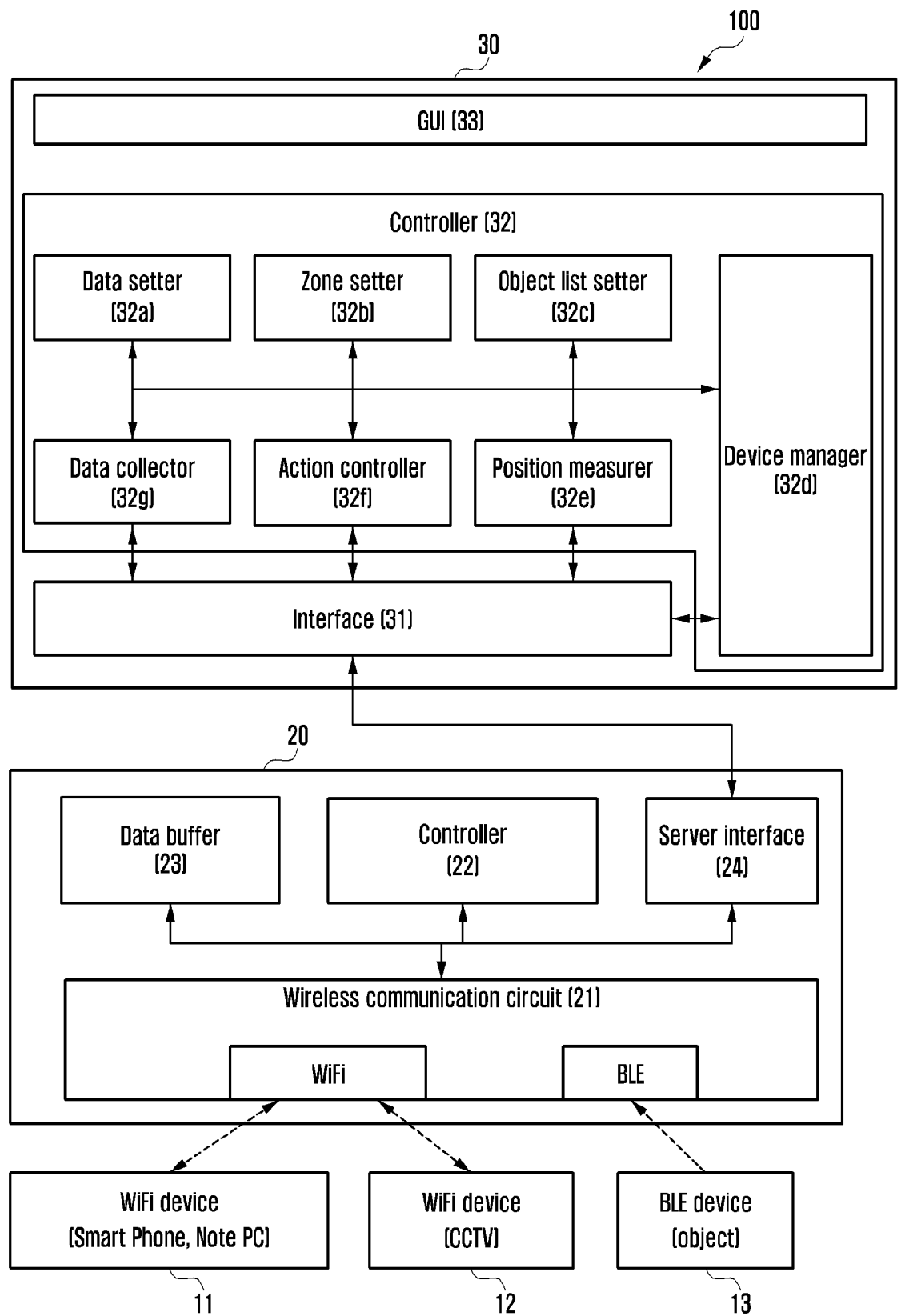
FIG. 4 is a block diagram of the object management system according to an embodiment of the disclosure.
Figure 5A:
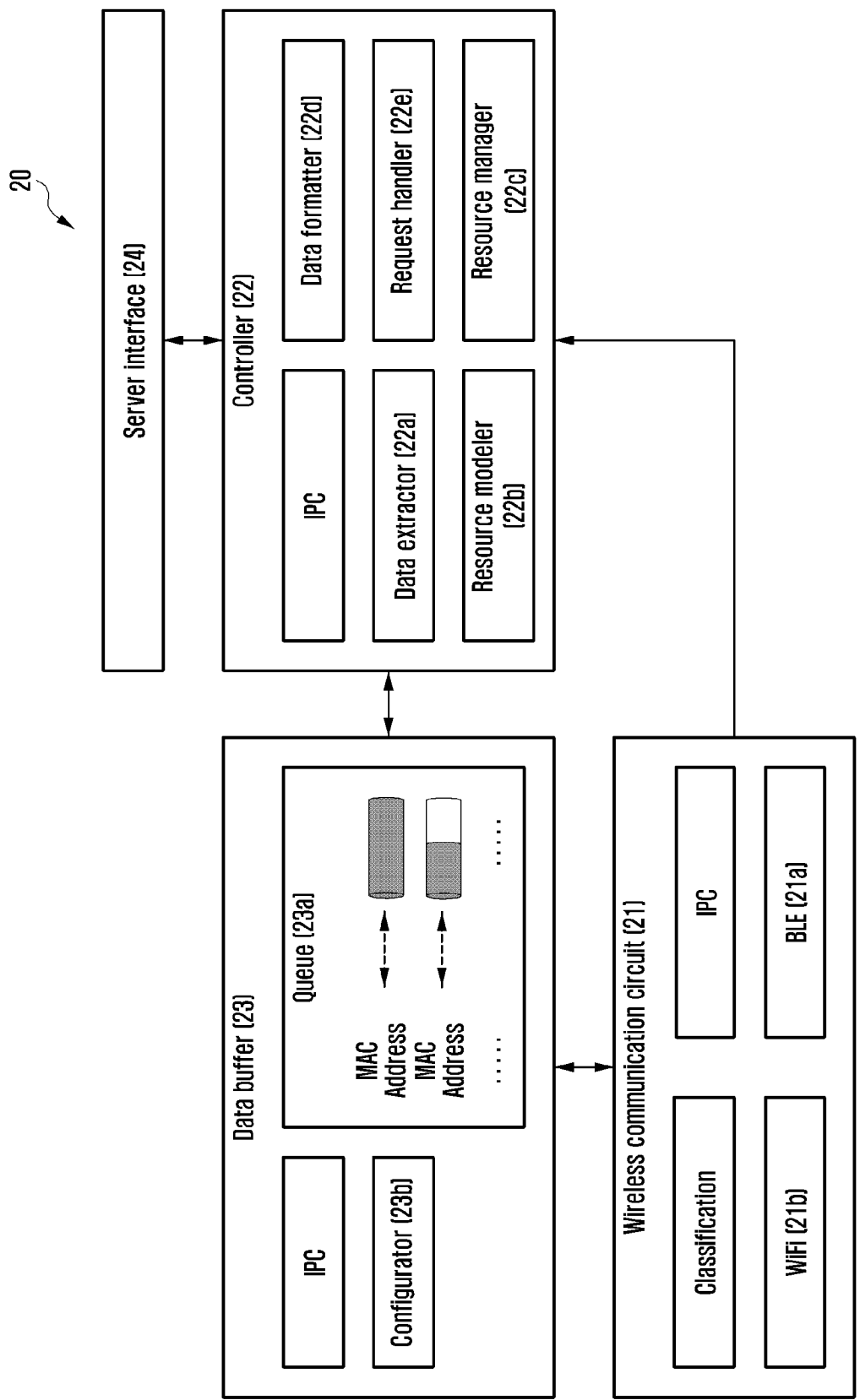
FIG. 5A is a detailed block diagram of an AP according to an embodiment of the disclosure.
Figure 5B:
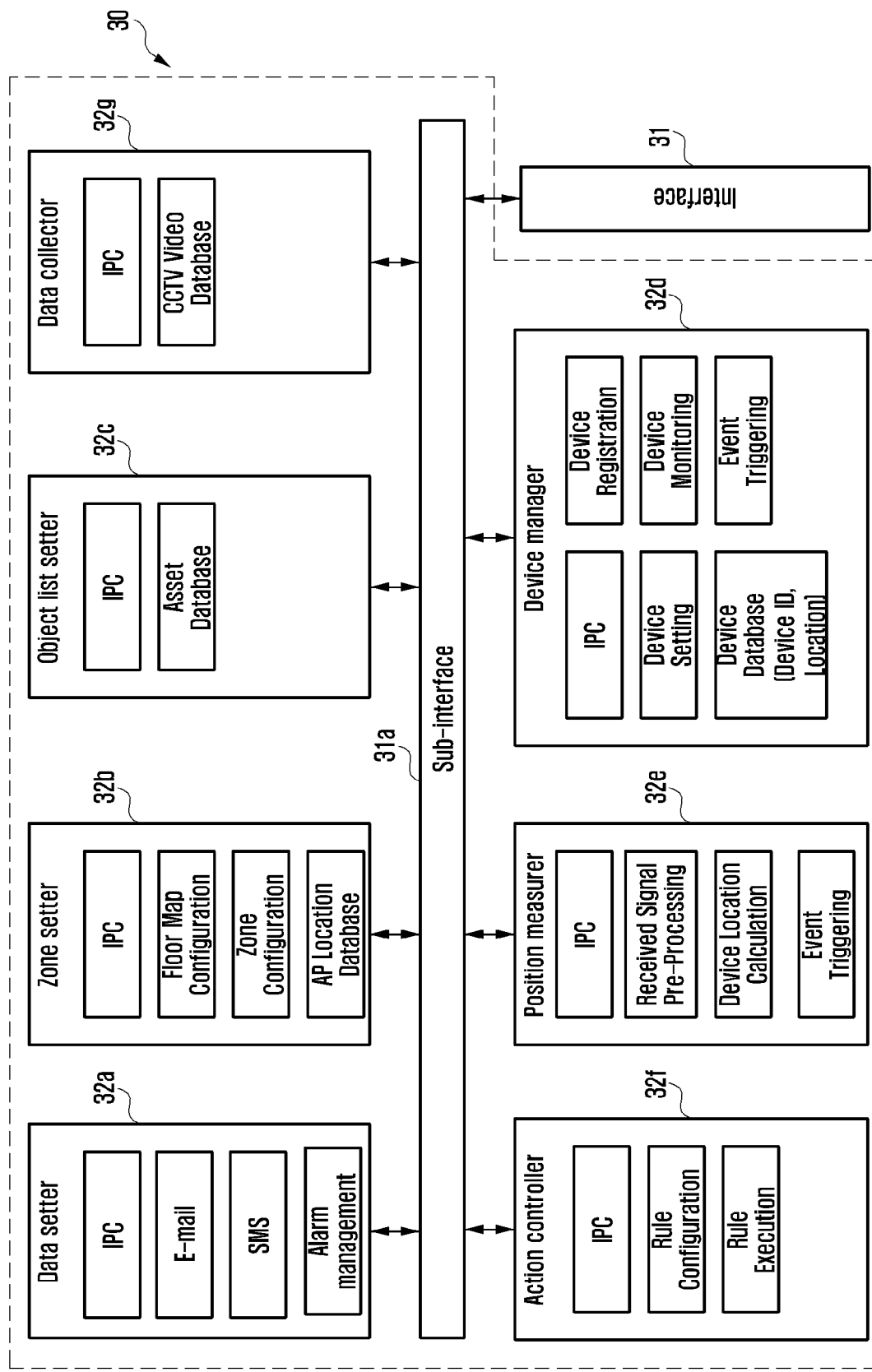
FIG. 5B is a detailed block diagram of a management server according to an embodiment of the disclosure.

FIG. 4 is a block diagram of the object management system according to an embodiment of the disclosure. FIG. 5A is a detailed block diagram of an AP according to an embodiment of the disclosure. FIG. 5B is a detailed block diagram of a management server according to an embodiment of the disclosure.

With reference to FIG. 4, in one embodiment, the plurality of devices may include, for example, Wi-Fi devices 11 and 12 based on Wi-Fi and a BLE device 13 based on BLE. Although not shown, the devices of the management system may further include a ZigBee device (e.g., lighting fixture).

In one embodiment, the Wi-Fi devices 11 and 12 may include a user terminal (such as a smartphone, a notebook computer or a PDA), a Wi-Fi CCTV device for transmitting image information through Wi-Fi technology, and an access control reader. The object to be managed 13 with an attached BLE tag can transmit a radio signal to the AP 20 via BLE communication.

In one embodiment, the AP 20 may include a wireless communication circuit 21, a controller 22, a data buffer 23, and a server interface 24.

The wireless communication circuit 21 may support wireless connections with multiple devices included in the management system. That is, the wireless communication circuit 21 can receive radio signals from various devices through Wi-Fi, BLE, or ZigBee communication. In one embodiment, with reference to FIG. 5A, the wireless communication circuit 21 may receive various signals through different wireless connection schemes and classify the signals according to the devices.

More specifically, the wireless communication circuit can connect to a Wi-Fi device and receive a Wi-Fi radio signal through the Wi-Fi signal receiver 21b. Here, the Wi-Fi signal receiver 21b can assign different BSSIDs to a user device and a CCTV device to separately manage a Wi-Fi signal received from the user device and a Wi-Fi signal received from the CCTV device. For example, "BSSIDUSER" may be assigned to a user device, and "BSSIDCCTV" may be assigned to the CCTV device other than the user device.

In addition, the wireless communication circuit 21 may receive a BLE radio signal emitted by a BLE device by periodically scanning BLE signals through the BLE signal receiver 21a. For example, the BLE signal may include an ID for identifying an object to be managed. Also, the BLE signal can be used as information for detecting a change in the state of the object to be managed. For example, the information for detecting a state change in the object to be managed may include information about the location or battery state of the object to be managed.

The Wi-Fi radio signals and the BLE radio signals received from various devices can be classified by the wireless communication circuit 21 and transmitted to different components of the AP 20. For example, the wireless communication circuit 21 may transmit radio signals received from plural devices to the controller 22. The wireless communication circuit 21 can also transmit a radio signal received from a specific one of the plural devices to both the controller 22 and the data buffer 23.

For example, when image information is received from the CCTV device with BSSIDCCTV, the wireless communication circuit 21 can transmit the Wi-Fi MAC information identifying the CCTV device and the image information of the CCTV device to both the controller 22 and the data buffer 23. Here, IPC communication can be used for signal transmission between the wireless communication circuit 21 and the controller 22, and between the wireless communication circuit 21 and the data buffer 23.

In one embodiment, the controller 22 may map information items obtained from the various signals received through the wireless communication circuit 21 to the corresponding devices and store the mapping information. More specifically, the data extractor 22a of the controller 22 may extract an information item (e.g., device ID) corresponding to a device from the signal received from the device. The resource modeler 22b of the controller 22 may classify the devices into types and map the extracted information items to the device types. The resource modeler 22b may store information on the mapping between the device types and information items as a mapping table. In addition, when new information related to the stored device type is received from the wireless communication circuit 21, the resource manager 22c can update the state of the corresponding device type according to the new information. The data formatter 22d of the controller 22 may format the information item that corresponds to a specific device and is to be sent to the management server 30. The request handler 22e of the controller 22 can process a request message for device-specific information received from the management server 30.

In one embodiment, the data buffer 23 may receive information included in a radio signal corresponding to a specific device from the wireless communication circuit 21. For example, the data buffer 23 can receive image information included in a radio signal received from the Wi-Fi CCTV device via the wireless communication circuit 21. The data buffer 23 may store received image information in the queue 23a for each Wi-Fi MAC information. When there is a request for image information corresponding to specific Wi-Fi MAC information from the controller 22, the data buffer 23 can transmit the requested image information through IPC communication.

The configurator 23b of the data buffer 23 may generate unit image data by dividing the image information stored in the queue 23a into preset units. The unit image data may be stored in the queue 23a in a manner corresponding to Wi-Fi MAC information.

In one embodiment, the AP 20 may include a server interface 24 to communicate with the management server 30. The server interface 24 can communicate with the management server 30 through various communication protocols such as HTTP, CoAP, and the like.

With reference to FIGS. 4 and 5B, in one embodiment, the management server 30 may include a controller 32, an interface 31, and a GUI 33.

In one embodiment, the management server 30 can receive various pieces of information related to multiple devices from the AP 20 via the interface 31. The interface 31 can communicate with the server interface 24 of the AP 20 through various communication protocols such as HTTP and CoAP. For example, through the interface 31, the management server 30 may transmit a request message for information on a specific device among the plural devices to the AP 20 or periodically receive information for determining the state of the object to be managed from the AP 20.

In one embodiment, the controller 32 of the management server 30 may configure at least some of the plural devices as objects to be managed, and manage the objects to be managed based on radio signals received from the objects to be managed. More specifically, when an object to be managed is configured, the controller 32 may designate a reference zone for the object to be managed and configure an event related to the object to be managed based on the reference zone. The event related to the object to be managed may correspond to a state change of the object to be managed with respect to the reference zone. In one embodiment, when an event occurs in relation to the object to be managed, the control unit 32 can track the object to be managed by notifying the occurrence of the event or invoking an action rule for analyzing the information related to the occurrence of the event.

In one embodiment, the controller 32 of the management server 30 may include a data setter 32a, a zone setter 32b, an object list setter 32c, a device manager 32d, a position measurer 32e, an action controller 32f, and a data collector 32g.

With reference to FIG. 5B, in one embodiment, the device manager 32d can configure at least one of the plural devices as an object to be managed. When the object to be managed is configured, the zone setter 32b can designate a reference zone serving as a criterion for determining occurrence of an event in relation to a state change of the object to be managed.

Here, the size, shape, and position of the reference zone can be determined in various ways. The size, shape, and position of the reference zone may be determined based on the size or state of the object to be managed located in the reference zone. The functions of the zone setter 32b are shown in Table 1 below.

TABLE 1

Functions of zone setter

| Module | Description |
| --- | --- |
| Floor map configuration | Edit and store floor map (set horizontal and vertical sizes of floor image), assign unique floor ID for each floor |
| Zone configuration | Specify an area of a rectangular (polygonal) shape in a floor map as a zone, set zone types (toilet, meeting room, parking zone) |
| AP location database | Location information of IoT AP in a floor map (coordinates) |

In one embodiment, when the object to be managed and the reference zone are specified, the action controller 32f can determine the event and its occurrence condition in relation to the type of a state change, the degree of the state change of the object to be managed. The action controller 32f can also set an action rule for performing an action in response to occurrence of a specified event.

The functions of the action controller 32f are shown in Table 2 below.

TABLE 2

Functions of action controller

| Module | Description |
| --- | --- |
| Rule configuration | Edit a rule that can specify an event type, event occurrence condition, and action to be executed |
| Rule execution | Execute a rule among the saved rules |

With reference to Table 2, the action controller 32f may specify various kinds of events, and, upon detecting an event occurrence, perform an action corresponding to the event according to an action rule. The embodiment related to the event types and occurrences will be described later with reference to FIGS. 7, 8A and 8B.

Meanwhile, when an event related to the object to be managed is specified, the device manager 32d and the position measurer 32e can detect a specific state change of the object to be managed in relation to the reference zone so as to determine occurrence of the event.

More specifically, the device manager 32d can periodically monitor the state of the object to be managed. For example, the device manager 32d may monitor the change in the power state or movement state of the object to be managed based on the number, type and strength of radio signals received from the object to be managed located in the reference zone.

The device manager 32d can also store and manage information items corresponding to the detected state change of the object to be managed. The functions of the device manager 32d may be summarized as shown in the following table.

TABLE 3

Functions of device manager

| Module | Description |
| --- | --- |
| Device registration | Device registration/deregistration |
| Device monitoring | Device state management |
| Event triggering | When an event occurs, send the event to the rule engine (events for new device registration, device deregistration, device state change) |
| Device setting | Device settings |
| Device database | Store device information for each device ID |

With reference to Table 3, the device manager 32d may newly register at least one device as an object to be managed for the reference zone or exclude a specific device from the devices registered as objects to be managed. In one embodiment, the object list setter 32c may store a list of devices newly set or registered as an object to be managed by the device manager 32d.

The device manager 32d may store state information such as the power or location of the device corresponding to the object to be managed. The device manager 32d may regard a specific state change of the object to be managed as an event, and may notify the action controller 32f of the occurrence of the event to perform an action corresponding to the event. For example, upon detecting an event indicating registration of a new device or deregistration of an existing device, the device manager 32d may notify the action controller 32f of the occurrence of the event so that the action controller 32f performs an action corresponding to the event.

In one embodiment, the position measurer 32e can measure the position of a device selected as the object to be managed. The functions of the position measurer 32e may be summarized as shown in Table 4 below.

TABLE 4

Functions of position measurer

| Module | Description |
| --- | --- |
| Preprocessing | preprocessor for position calculation, (average of BLE-tag specific signal values during position calculation cycle) |
| Location calculation | Device position calculator based on triangulation |
| Event triggering | For example, occurrence of an event corresponding to a specific degree of position change is notified to the rule engine |

The position measurer 32e can measure the initial position of the object to be managed based on radio signals received from the object to be managed, and can identify the position change of the object to be managed according to changes of radio signals received from the object to be managed. The position measurer 32e can determine that a specific event has occurred if the position change of the object to be managed is above a preset level.

As described above, when an event occurs in relation to the object to be managed, the action controller 32f may perform an action according to the action rule corresponding to the event.

In one embodiment, the data setter 32a can perform a notification function by notifying an event occurrence according to an action rule. For example, the data setter 32a can notify the type and information of an event to the administrator of the management server 30. The data setter 32a can notify the administrator of an event occurrence through an SMS message, an e-mail message, or an alarm sound including information on the event.

In one embodiment, when an event occurs, the data collector 32g may request the AP 20 to send detailed information about the event. For example, the data collector 32g can request the AP 20 to send the CCTV video information related to the event occurrence time, and receive the CCTV video information from the AP 20 and store it.

The components of the controller 32 described above can exchange information and communicate with each other through the sub-interface 31a. For example, the sub-interface 31a may support IPC communication.

Although not shown, the management server 30 may further include a user information manager. For example, the user information manager may store a list of users entering or leaving the area where the object to be managed is located or a list of users who can access the area. Later, when an event occurs, the user information manager may transmit a list of users related to the event to the data setter.

In one embodiment, the GUI (graphical user interface) 33 may provide the user (or manager) of the management server with notifications or information on events occurring in relation to the objects to be managed.

Next, a detailed description is given of a method for managing objects according to the disclosure with reference to the drawings.

Figure 6A:
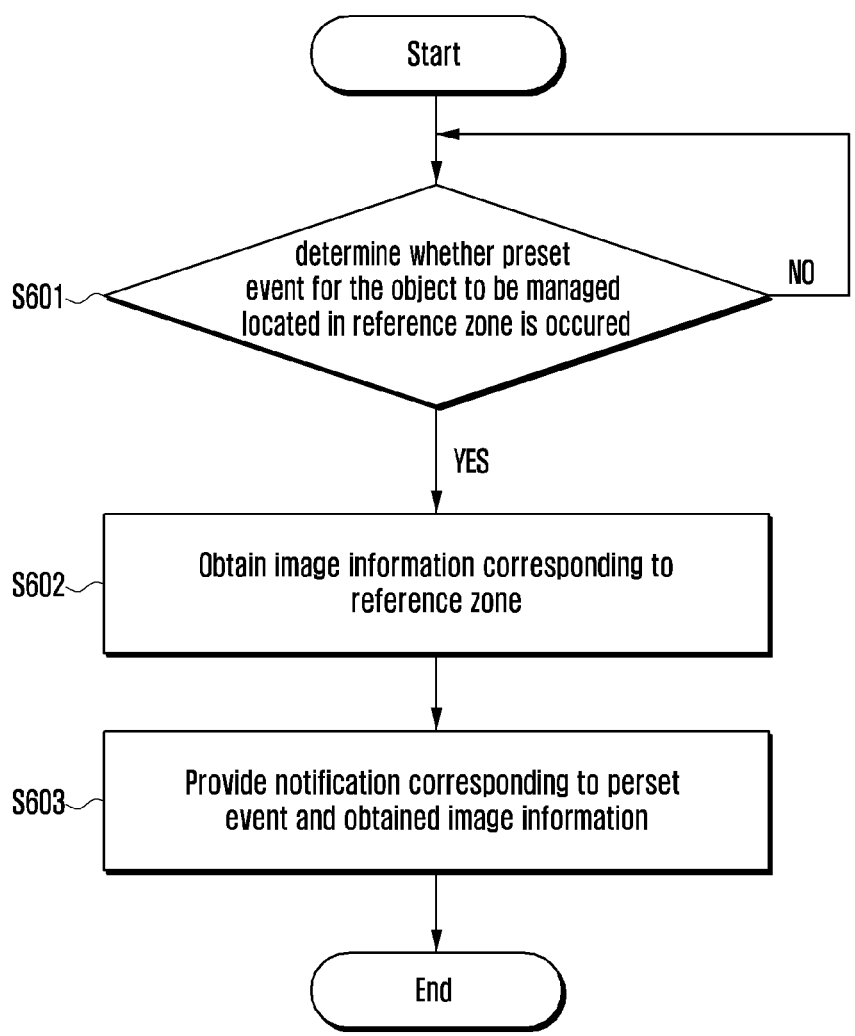
FIG. 6A is a flowchart of a method for managing an object to be managed according to an embodiment of the disclosure.
Figure 6B:
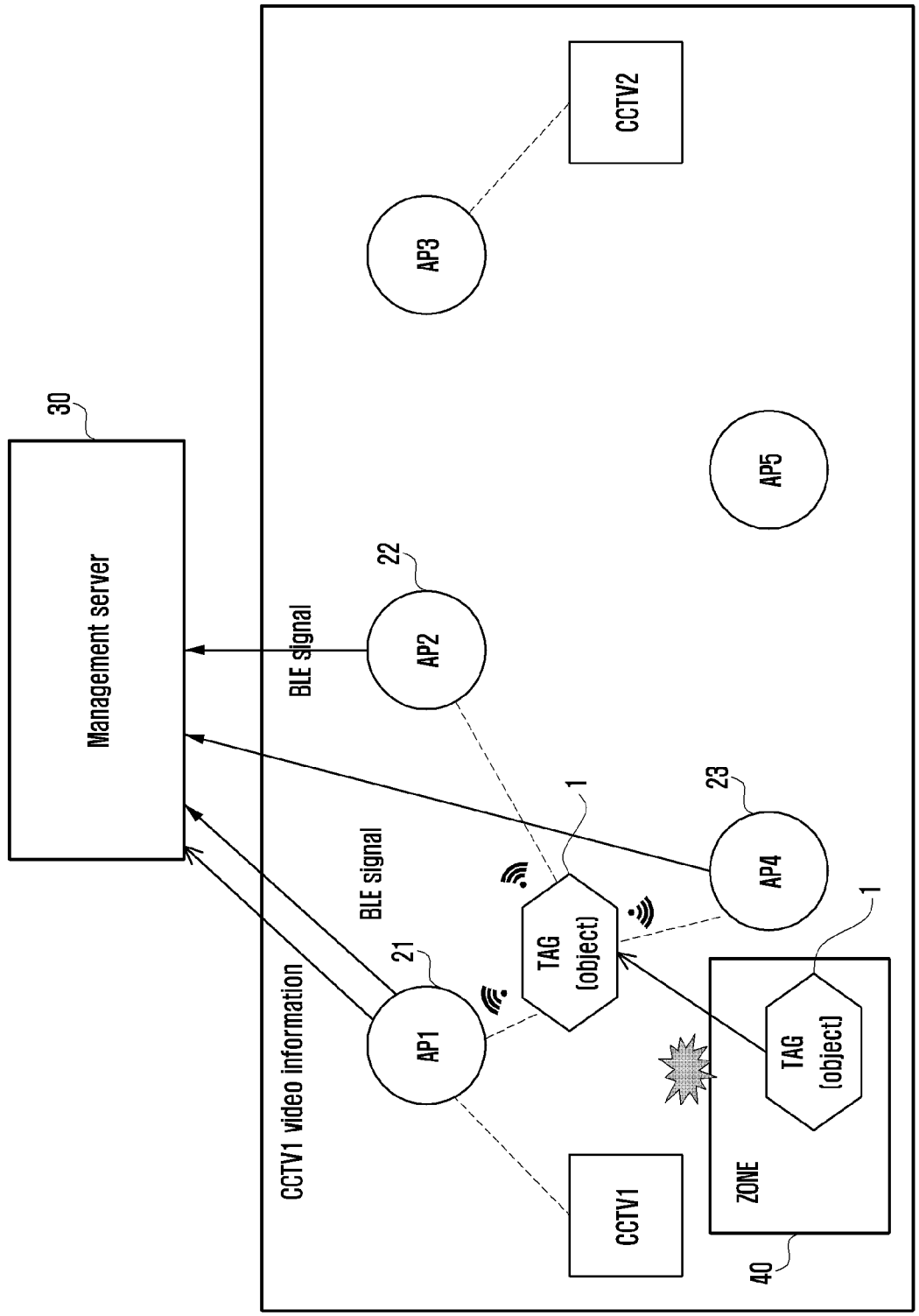
FIG. 6B is a conceptual diagram for explaining the flowchart of FIG. 6A.

FIG. 6A is a flowchart of a method for managing an object to be managed according to an embodiment of the disclosure. FIG. 6B is a conceptual diagram for explaining the flowchart of FIG. 6A.

In one embodiment, with reference to FIG. 6A, the management server can determine whether a preset event for the object to be managed located in the reference zone is occurred (S601).

The preset event may correspond to a specific state change of the object to be managed associated with the reference zone. For example, the preset event may correspond to a case where a new device is included in the reference zone as an object to be managed, a case where the power state of an object to be managed contained in the reference zone changes, or a case where a device corresponding to an object to be managed is removed from the list of objects to be managed. Examples of event types are shown in the following table.

TABLE 5

Examples of event types

| Event type | Event detector | Description |
| --- | --- | --- |
| Device registration | Device manager | Occurs when registering new device in IoT server |
| Device deletion | Device manager | Occurs when receiving device disconnection message |
| Specific state change of device | device manager | Occurs when device state changes (e.g., ON->OFF) |
| Device movement | Position measurer | Occurs when the level of device position change satisfies a preset condition |

As a detailed example, FIG. 6B shows an event occurrence where the position of the object to be managed deviates from the reference zone. In FIG. 6B, the object to be managed (1) with a BLE tag is located in the reference zone 40, and BLE signals emitted by the object to be managed (1) are scanned by the APs 21, 22 and 23 located adjacent to the object to be managed (1). The APs 21, 22 and 23 can detect movement of the object to be managed (1) or deviation of the object to be managed (1) from the reference zone 40 by using BLE signals received from the object to be managed (1).

In one embodiment, when a preset event occurs, the management server can obtain image information corresponding to the reference zone (S602).

Here, the image information corresponding to the reference zone may be captured image data of the reference zone. In one embodiment, the management server can obtain image information through the AP from a CCTV device wirelessly connected to the AP. For example, as shown in FIG. 6B, the management server can obtain image data captured by a Wi-Fi CCTV device for the reference zone.

In one embodiment, when the image information corresponding to the reference zone is obtained, the management server can provide the manager of the management server with the obtained image information with a notification corresponding to preset event (S603).

The notification of a generated event can be determined by an action according to the action rule corresponding to the event. For example, the notification may be an SMS message or an E-mail message that contains information indicating the exit of the object to be managed from the reference zone.

The management server may provide the manager with the image information of the reference zone together with a notification of the event occurrence.

As described above, when an event occurs in relation to the object to be managed, the management server may not only notify the event occurrence but also provide the manager with image information that can be used to identify the type and contents of the event. Hence, the management server according to an embodiment of the disclosure allows the manager or administrator to easily identify the cause of the event occurrence and the state of the object to be managed, enabling the manager to readily track the object to be managed.

Figure 7:
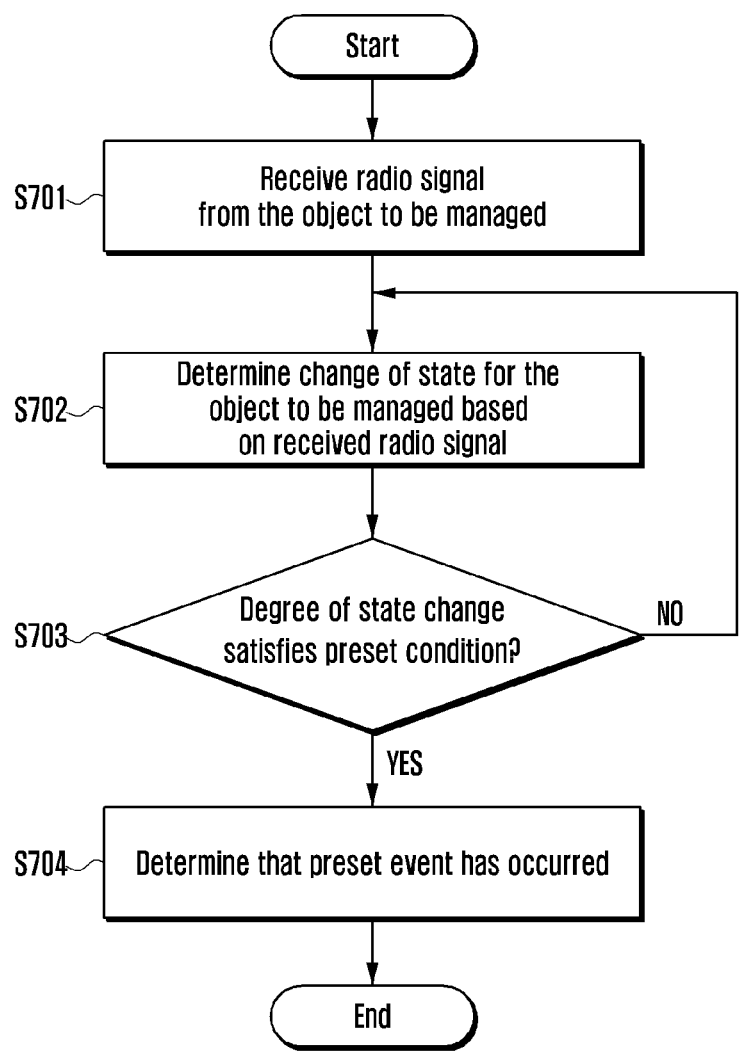
FIG. 7 is a flowchart of a method for determining occurrence of an event related to an object to be managed.
Figure 8A:
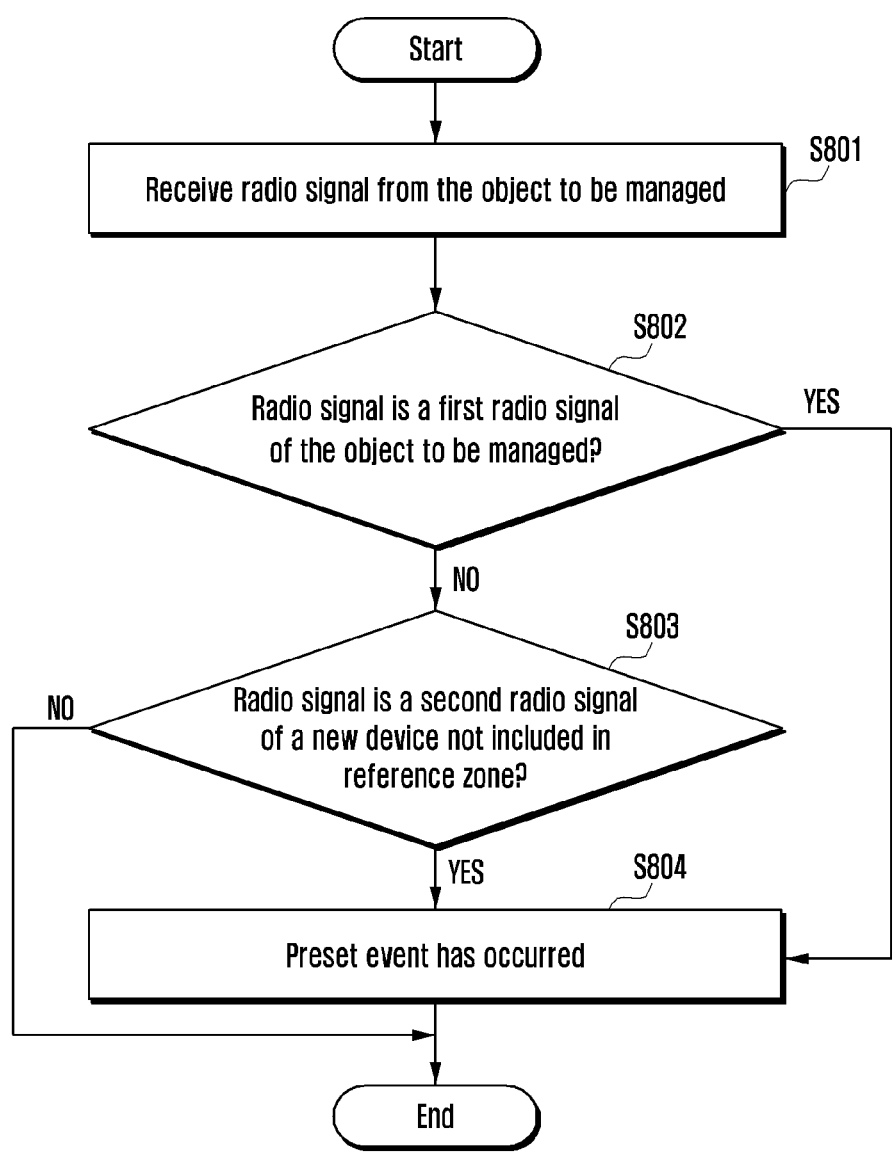
FIGS. 8A and 8B are flowcharts of a method for determining occurrence of an event by type.
Figure 8B:
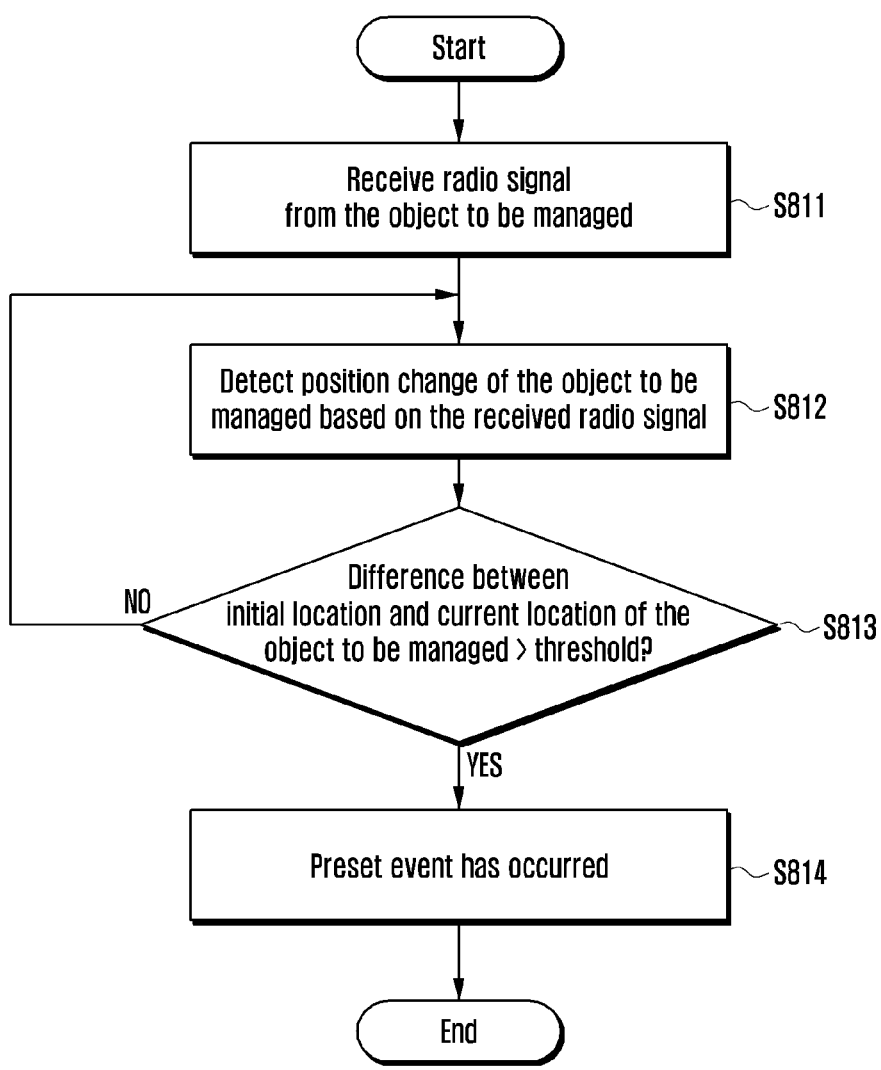

FIG. 7 is a flowchart of a method for determining occurrence of an event related to the object to be managed. FIGS. 8A and 8B are flowcharts of a method for determining occurrence of an event by type.

In one embodiment, with reference to FIG. 7, the management server can receive a radio signal from the object to be managed through the AP wirelessly connected with the object to be managed (S701).

Here, the radio signal of the object to be managed can be used to detect a state change of the object to be managed. The radio signal of the object to be managed can be continuously received according to a preset period.

In one embodiment, upon receiving a radio signal from the object to be managed, the management server can determine a change of the state for the object to be managed based on the received radio signal (S702).

More specifically, in one embodiment, the management server can identify the state of the object to be managed in the reference zone (e.g., power state or location of an object to be managed, or types and number of objects to be managed) on the basis of the type, number and strength of the radio signals. The management server can also determine whether the state of the object to be managed changes based on the degree of change in the type, number and strength of the radio signals periodically received. For example, if the number of radio signals received in a first period is different from the number of radio signals received in a second period, the management server can determine that the state of the object to be managed has changed. As another example, if the strength of radio signals received in the second period is weaker than the intensity of radio signals received in the first period, the management server can determine that the state of the object to be managed has changed.

In one embodiment, upon determining that the state of the object to be managed has changed, the management server can check whether the degree of state change in the object to be managed satisfies a preset condition (S703).

Here, the preset condition may be related to the degree of change in the number, type and strength of the radio signals received from the object to be managed. For example, the preset condition may include information about the number of received radio signals, the degree of change in strength of received radio signals, or the types of received radio signal.

For example, when the number of radio signals received in the second period is greater than the number of radio signals received in the first period by a preset number, the management server may determine that the state change of the object to be managed satisfies the preset condition. As another example, when the strength of the radio signal received in the second period is larger than the strength of the radio signal received in the first period by a preset degree, the management server may determine that the state change of the object to be managed satisfies the preset condition. In one embodiment, if the state change of the object to be managed satisfies the preset condition, the management server can determine that a preset event has occurred (S704).

For example, if the preset condition corresponds to a change in the number of radio signals by a given number, the management server can determine that an event has occurred where the number of objects to be managed included in the reference zone is changed.

That is, in one embodiment, various types of events can be specified according to the state change of the object to be managed and the condition related to the state change.

FIGS. 8A and 8B are flowcharts of a method for determining occurrence of an event by type.

In one embodiment, with reference to FIG. 8A, the management server may receive a radio signal from the object to be managed (S801). Thereafter, the management server can determine whether the type of the radio signal received from the object to be managed is identical to the type of the radio signal registered with respect to the reference zone or can determine whether the received radio signal is a radio signal of an object to be managed included in the reference zone. In this case, the preset condition related to the state change of the object to be managed may be related to the type of the radio signal.

In one embodiment, the management server can determine whether the received radio signal is a first radio signal of the object to be managed included in the reference zone (S802).

For example, the first radio signal may be a connection release request signal for releasing the connection of the object to be managed included in the reference zone. In this case, the management server can determine that the preset condition related to the type of the radio signal is satisfied based on the reception of a specific radio signal from the object to be managed.

In one embodiment, the management server may determine that a preset event has occurred in relation to the object to be managed included in the reference zone (S804).

In this case, the preset event may correspond to the deletion of the object to be managed having transmitted a specific radio signal from the list of objects to be managed located in the reference zone.

Otherwise, if the received radio signal is not the first radio signal, the management server may determine whether the received radio signal is a second radio signal corresponding to a new device not included in the reference zone (S803).

If the received radio signal corresponds to a second radio signal received from a new device not included in the reference zone, the management server can determine that a preset event has occurred in relation to the reference zone (S804).

In this case, the preset event may correspond to configuring a new device corresponding to the second radio signal as an object to be managed in the reference zone.

Although not shown in the figure, in one embodiment, when an event occurs where an existing device registered as an object to be managed is removed from the reference zone or a new device is registered as an object to be managed in the reference zone, the management server can update the list of objects to be managed according to the event occurrence. In addition, the management server can provide the updated object list information to the manager. Hence, when the list of objects to be managed is updated, the management server can later determine the occurrence of an event based on the updated list information.

In another embodiment, with reference to FIG. 8B, the management server may receive a radio signal from the object to be managed (S811), and can detect a change in the position of the object to be managed based on the received radio signal (S812).

More specifically, in one embodiment, to accurately identify the location of an object to be managed, the management server can store various location information related to the space where the object to be managed is located. For example, the management server may store information regarding the number of floors in the space, the height or width of a specific floor, the device ID and location of the AP in the floor, the CCTV device installed in the floor, and the size, shape and location of the reference zone set in the floor.

The location change of the object to be managed can be detected with respect to the initial location of the object to be managed. Here, the initial location of the object to be managed can be stored in the management server in association with various location information items. The management server can analyze the type and strength of a radio signal received from the object to be managed and measure the initial location of the object to be managed by using various location information.

Thus, in one embodiment, once the initial location of the object to be managed is determined, the management server can determine whether the location of the object to be managed is changed from the initial location based on a radio signal received from the object to be managed (S812).

The management server can determine the degree to which the object to be managed is moved by comparing the initial location of the object to be managed with the location calculated based on the radio signal. That is, the management server can compare the difference between the initial location and the current location of the object to be managed with a preset threshold (S813).

In this case, the preset condition serving as a basis for determining an event occurrence may be the preset threshold for the degree of position change.

In one embodiment, upon determining that the difference between the current location and the initial location of the object to be managed is greater than or equal to the preset threshold, the management server can determine that the preset event has occurred in relation to the object to be managed (S814).

As described above, the management server according to an embodiment of the disclosure may detect a state change of the object to be managed by analyzing radio signals periodically received from the object to be managed, and determine whether the state change of the object to be managed satisfies the preset condition. If the state change satisfies the preset condition, the management server may determine that the preset event has occurred and perform an action corresponding to the event, thereby facilitating tracking of the object to be managed.

Figure 9:
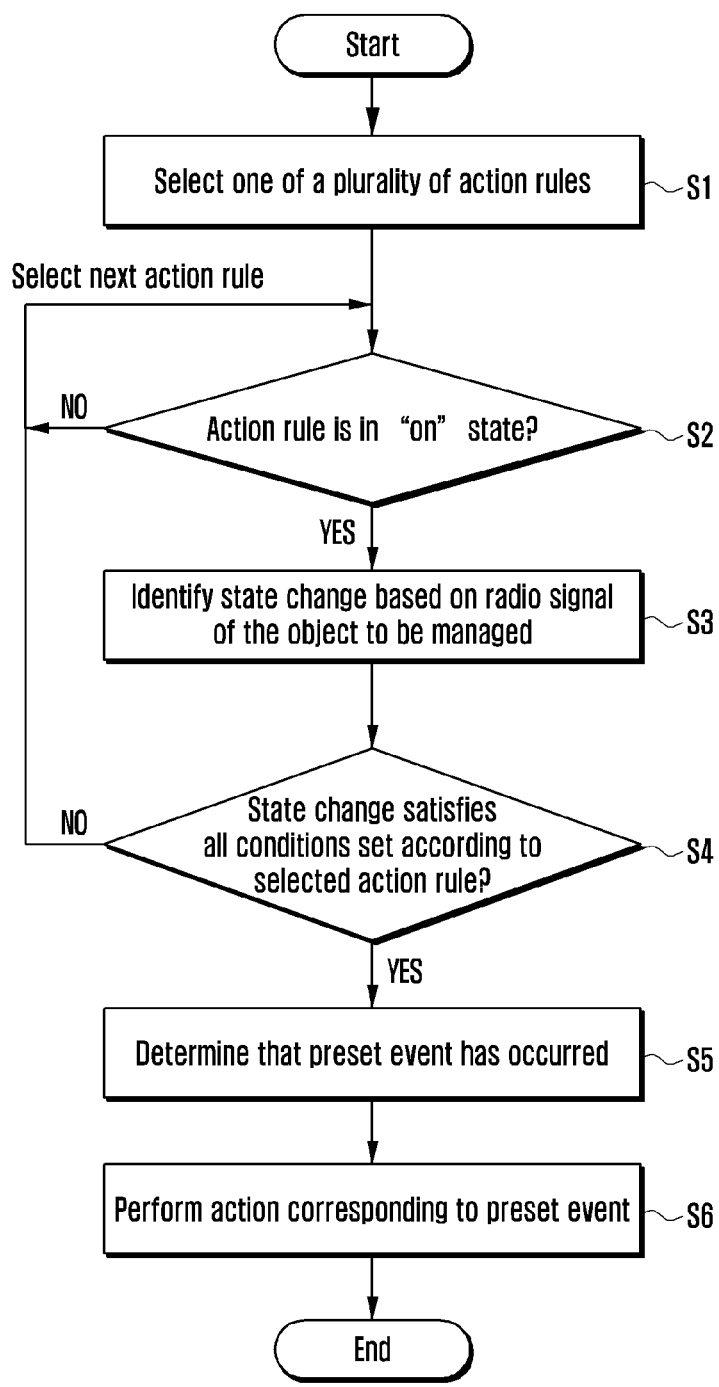
FIG. 9 is a flowchart of a method for the management server to manage an object to be managed by executing an operation related to an event of the object to be managed according to an embodiment of the disclosure.

FIG. 9 is a flowchart of a method for the management server to manage an object to be managed by executing an action corresponding to an event related to the object to be managed according to an embodiment of the disclosure.

In one embodiment, the management server can select one of a plurality of action rules set in association with the object to be managed (S1).

In this embodiment, it is assumed that a plurality of action rules are set in association with the object to be managed. Alternatively, only one action rule may be set with respect to the object to be managed. Even if the management server does not select one of the plural action rules, the action rules related to the object to be managed can be evaluated in sequence according to a given order.

Here, the action rule may include all settings related to the event type, the type and number of preset conditions for determining an event occurrence, and the action to be performed in response to the event occurrence. For example, an action rule may include settings for an event associated with one object to be managed included in a reference zone, or may include settings for plural events related to plural objects to be managed included in a reference zone. As another example, an action rule may include settings for plural events related to plural objects to be managed included in multiple reference zones. Next, a description is given of an action rule related to one object to be managed included in a single reference zone.

In one embodiment, after selecting one action rule, the management server may check whether the selected action rule is in the "on" state (S2).

That is, the management server can check whether the selected action rule is set to be operable by the manager. If the selected action rule is not in the "on" state, the management server can check another action rule among the plural action rules. That is, the management server may select the next action rule and examine the next action rule ("on" state or "off" state).

In one embodiment, if the selected action rule is in the on state, the management server can identify a state change of the object to be managed included in the reference zone based on a radio signal received from the object to be managed (S3).

When plural conditions are configured by the management server in association with a state change of the object to be managed, the management server can determine whether the state change of the object to be managed satisfies all the conditions set according to the selected action rule (S4).

For example, when multiple conditions are set in relation to the object to be managed, the management server can first check whether the state change identified based on a radio signal received from the object to be managed satisfies a first condition among the multiple conditions. Then, upon determining that the state change identified based on a radio signal satisfies the first condition, the management server can check whether the state change identified based on a radio signal satisfies a second condition among the multiple conditions.

As a more detailed example, if the preset event is related to the number of objects to be managed registered in the reference zone, the preset first condition may be associated with the number of radio signals received from the objects to be managed. If the preset number of radio signals matches the number of received radio signals, the management server can check whether a preset second condition is present. For example, if the preset second condition specifies that the number of radio signals is greater than a preset number, the management server can further determine whether the number of received radio signals is greater than the preset number. Here, if the number of received radio signals is less than the preset number, the management server can determine that an event has occurred.

Specifically, examples of plural conditions that can be set with respect to an event are shown in the following table.

TABLE 6

Examples of multiple conditions for event occurrence

| Condition type | Operator | User input (selection value) | Description |
|---|---|---|---|
| Device location | Different | Target zone | Device location is outside selected zone |
| Device location | Same | Target zone | Device location is inside selected zone |
| Number of devices | Same | Count | The number of devices equals comparison value |
| Number of devices | Different | Count | The number of devices differs from comparison value |
| Number of devices | Less | Count | The number of devices is less than comparison value |
| Number of devices | Greater | Count | The number of devices is greater than comparison value |
| Device attribute (BLE tag battery) | Same | Target battery level (%) | BLE tag battery equals target value |
| Device attribute (BLE tag battery) | Less | Battery level threshold (%) | BLE tag battery is less than target value |
| Time | Same | Target time | The time equals target time |
| Time | Different | Target time | The time differs from target time |
| Time | Greater | Target time | The time is greater than target time |
| Time | Less | Target time | The time is less than target time |
| Target device | Same | Device ID | Target device corresponds to preset device ID |
| Target device | Different | Device ID | Target device does not correspond to preset device ID |
| Target device type | Same | Device type | Target device is of preset device type (ex. CCTV, BLE TAG, IOT AP, etc.) |
| Target device type | Different | Device type | Target device is not of preset device type |
| Target device group | Same | Device group | Target device belongings to configured device group |
| Target device group | Different | Device group | Target device does not belonging to configured device group |

As described above, when a plurality of conditions are set in relation to the object to be managed, the management server can sequentially examine the conditions to determine whether all the conditions are satisfied. If any one of the plural conditions is not satisfied, the management server can determine that the action corresponding to the selected action rule cannot be performed, and then select another rule related to the object to be managed and repeat the above-described steps.

In one embodiment, upon determining that all the conditions according to the action rule are satisfied, the management server can determine that the preset event has occurred (S5). Then, the management server can perform an action corresponding to the preset event (S6).

The action corresponding to the preset event may include, for example, outputting alarm information indicating the event occurrence, or providing image information related to the event occurrence.

As described above, when there are plural action rules, it is possible to easily check various events occurring in relation to the object to be managed by sequentially evaluating each action rule. Hence, the object to be managed can be efficiently tracked.

Meanwhile, the image information provided for the action corresponding to the event occurrence can be obtained from the shooting device taking images of the reference zone. The shooting device continuously captures the reference zone, and the image information includes captured image data of the reference zone in all viewpoints. In one embodiment, the AP may selectively provide image information related to an event occurrence to the management server. This is described with reference to FIGS. 5A and 10.

Figure 10:
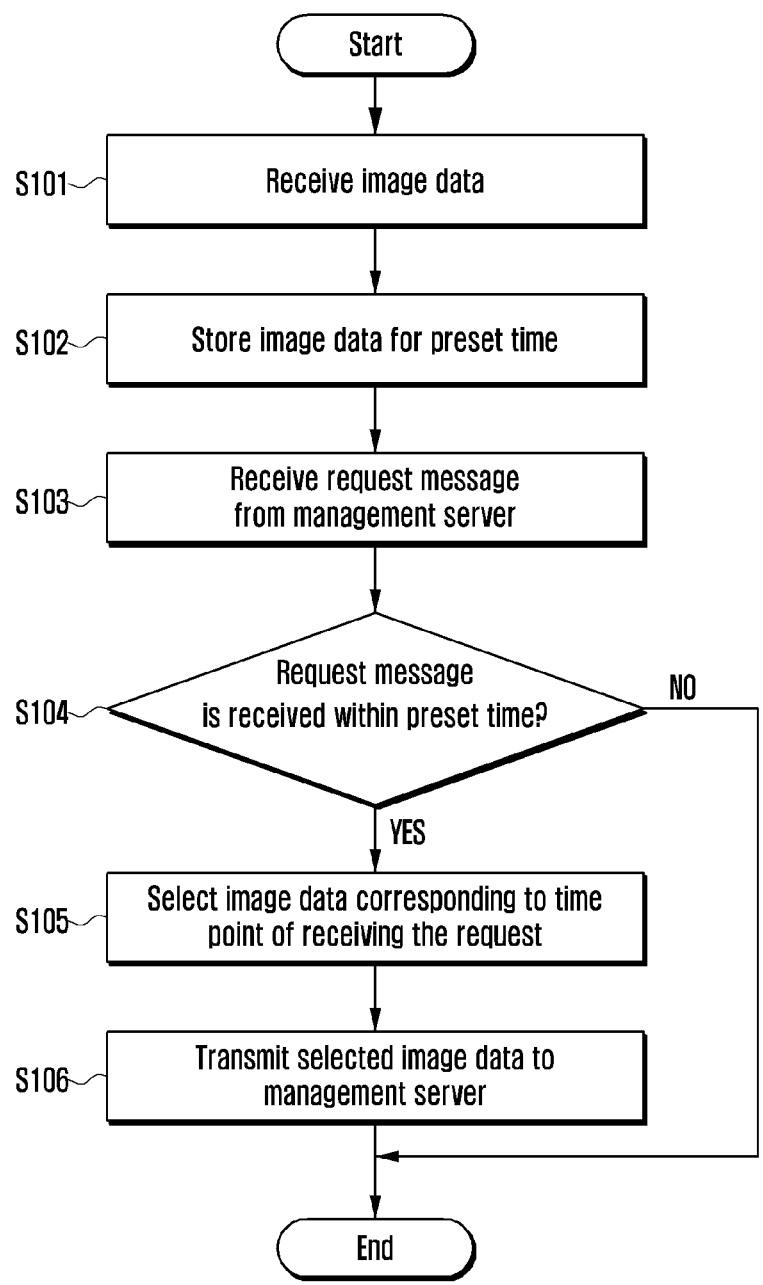
FIG. 10 is a flowchart of a method for providing image information related to an event occurrence.

FIG. 10 is a flowchart of a method for providing image information related to an event occurrence.

In one embodiment, with reference to FIGS. 5A and 10, the data buffer 23 of the AP 20 may receive image information from the CCTV device (S101) and may store the received image information for a preset duration (S102).

More specifically, the data buffer 23 may divide the image information of the CCTV device transmitted through the wireless communication circuit 21 into preset units and store the pieces of unit image data. The data buffer 23 may also store pieces of unit image data corresponding to the preset duration.

Thereafter, a request message for image information may be received from the management server (S103).

Here, the request message may include a CCTV ID to request image information of a specific CCTV device. In one embodiment, the management server can transmit a request message for image information at various timings. For example, the management server may transmit a first request message for image information at the time of detecting the movement of the object to be managed from the initial position within the reference zone. The management server can transmit a second request message for image information at the time point when the object to be managed undergoes a position change above a preset level. The management server can transmit a third request message for image information at the time when the object to be managed exits the reference zone.

In one embodiment, the data buffer 23 may determine whether the request message is received within a preset time for storing the image data (S104).

The data buffer 23 may store the image data of the reference zone only for a preset time and may delete the image data when the time expires. Hence, if the request message is received within the preset time, the data buffer 23 can select the unit image data of a specific interval corresponding to the time point at which the request is received among the pieces of unit image data (S105). Then, the data buffer 23 can transmit the selected unit image data to the management server 30 through the server interface 24 (S106).

In one embodiment, the data buffer 23 temporarily stores image data for a preset time unit. Hence, when a preset event occurs in relation to the object to be managed, the data buffer 23 may selectively provide the management server with image data of a given time before and after the event occurrence time. In other words, when a preset event occurs in relation to the object to be managed, the object to be managed can be efficiently tracked by using the selectively provided image data without searching and analyzing all the captured images of the object to be managed.

In another embodiment, it is possible to change the reference zone under certain circumstances. For example, when it is difficult to obtain image information due to a failure of a shooting device taking images of the reference zone, the management server can configure a changed reference zone.

Figure 11:
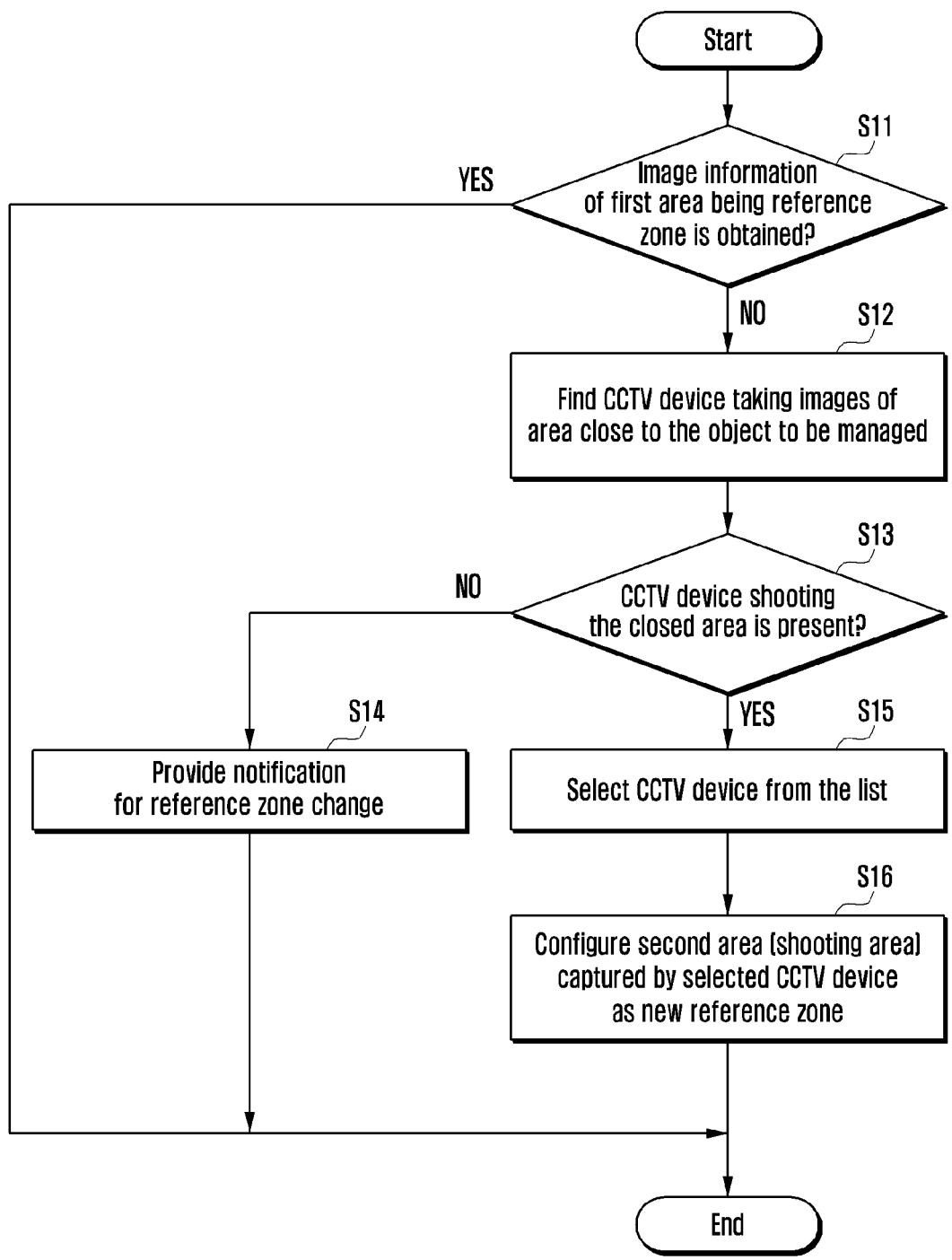
FIG. 11 is a flowchart of a method for changing the reference zone.

FIG. 11 is a flowchart of a method for changing the reference zone.

The management server may configure a first area as the reference zone and determine whether image information of the first area is obtained (S11).

If image information of the first area is not obtained, the management server can find a list of shooting devices (CCTV device) taking images of the area close to the object to be managed (S12).

Here, the fact that image information of the first area is not obtained may correspond to a situation where the wireless connection between the shooting device and the AP is disrupted or a situation where there is substantially no data traffic due to an IP collision between the shooting devices.

If a shooting device capturing the area close to the object to be managed is not found from the list of shooting devices, the management server can generate a notification including information indicating the necessity of changing the reference zone and information indicating the connection state or operation state of the shooting device for the first area (S14).

If a shooting device capturing the area close to the object to be managed is found from the list of shooting devices (S13), the management server can select one of the shooting devices (S15). For example, the management server may select a shooting device that is closest to the object to be managed among the shooting devices. In addition, if the object to be managed is moved, the management server may select a shooting device capturing the new position of the object to be managed or a shooting device capturing the position corresponding to the movement path of the object to be managed on the basis of the state information of the object to be managed.

Then, the management server can configure the second area captured by the selected shooting device as a new reference zone (S16).

As described above, the management server according to an embodiment of the disclosure can provide an efficient tracking method for the object to be managed by performing various operations in response to the event occurring in relation to the object to be managed.

Hereinabove, various embodiments of the disclosure have been shown and described for the purpose of illustration without limiting the subject matter of the disclosure. It should be understood by those skilled in the art that many variations and modifications of the method and apparatus described herein will still fall within the spirit and scope of the disclosure as defined in the appended claims and their equivalents.

Embodiments of the disclosure have been described with reference to the accompanying drawings. Specific terms or words used in the description should be construed in accordance with the spirit of the disclosure without limiting the subject matter thereof. It should be understood that many variations and modifications of the basic inventive concept described herein will still fall within the spirit and scope of the disclosure as defined in the appended claims and their equivalents.

The invention claimed is:

1. A method by a server in a wireless communication system, the method comprising:
   receiving a radio signal from an object to be managed located in a reference zone;
   detecting whether a state of the object to be managed is changed based on at least one of a type of the received radio signal, or a strength of the received radio signal;
   determining that a preset event for the object to be managed has occurred when a degree of the change of the state satisfies a preset condition;
   obtaining image information corresponding to the reference zone, in case that the preset event has occurred; and
   providing the obtained image information with a notification corresponding to the preset event.

2. The method of claim 1, wherein obtaining image information corresponding to the reference zone comprises:
   establishing a wireless connection to a shooting device configured to capture images of the reference zone; and
   obtaining captured image data for the reference zone captured by the shooting device.

3. The method of claim 2, further comprising:
   requesting image information corresponding to a shooting interval related to a time point at which the preset event has occurred, among the captured image data for the reference zone.

4. The method of claim 3, wherein the preset event includes an exit of the object to be managed from the reference zone, and
wherein the requested image information includes image information corresponding to a shooting interval including a time point at which the object to be managed has exited the reference zone, among the captured image data for the reference zone.

5. The method of claim 1, further comprising:
storing a list of objects to be managed included in the reference zone,
wherein, when the radio signal is received from the object to be managed or a second radio signal is received from a new object to be managed in the reference zone, the list of objects to be managed included in the reference zone is updated, and
wherein the notification includes information on the updated list of objects to be managed.

6. The method of claim 1, further comprising:
configuring a first area including the object to be managed as the reference zone; and
configuring, if image information corresponding to the first area is not obtained, a second area differing in at least one of a size, a shape, or a position from the first area as the reference zone,
wherein the image information includes image data captured for the first area, and
wherein the second area is determined to be a shooting area of a shooting device configured to capture images of an area close to a position of the object to be managed, among shooting devices wirelessly connected to the server.

7. A management server comprising:
an interface configured to receive a radio signal from an object to be managed located in a reference zone; and
a controller connected to the interface, the controller configured to:
detect whether a state of the object to be managed has changed based on at least one of a type of the received radio signal, or a strength of the received radio signal; and
determine that a preset event for the object to be managed has occurred when a degree of the change of the state satisfies a preset condition,
wherein the interface is further configured to obtain image information corresponding to the reference zone, in case that the preset event has occurred, and
wherein the controller is further configured to provide the obtained image information with a notification corresponding to the preset event.

8. The management server of claim 7, wherein the interface is further configured to obtain captured image data for the reference zone captured by a shooting device, from an access point (AP) wirelessly connected with the shooting device, and
wherein the controller is further configured to control the interface to transmit a request message to the AP for image information corresponding to a shooting interval related to a time point at which the preset event has occurred, among the captured image data for the reference zone.

9. The management server of claim 8, wherein the preset event includes an exit of the object to be managed from the reference zone, and
wherein the requested image information includes image information corresponding to a shooting interval including a time point at which the object to be managed has exited the reference zone, among the captured image data of the reference zone.

10. The management server of claim 7, wherein the controller is further configured to:
configure a first area including the object to be managed as the reference zone; and
configure, if image information corresponding to the first area is not obtained, a second area differing in at least one of a size, a shape, or a position from the first area as the reference zone.

11. The management server of claim 10, wherein the image information includes image data captured for the first area, and
wherein the controller is further configured to select a shooting device configured to capture images of an area close to a location of the object to be managed, among the shooting devices wirelessly connected to a wireless access point (AP), and determine a shooting area of the selected shooting device as the second area.

* * * * *